(12) United States Patent
Kuo et al.

(10) Patent No.: US 8,705,847 B2
(45) Date of Patent: Apr. 22, 2014

(54) METHOD AND SYSTEM OF TWO-DIMENSIONAL TO STEREOSCOPIC CONVERSION

(75) Inventors: Chia-Chen Kuo, Taichung (TW); Jung-Shan Lin, Taipei (TW)

(73) Assignee: Cyberlink Corp., Shindian, Taipei (TW)

( * ) Notice: Subject to any disclaimer, the term of this patent is extended or adjusted under 35 U.S.C. 154(b) by 371 days.

(21) Appl. No.: 13/249,489

(22) Filed: Sep. 30, 2011

(65) Prior Publication Data

US 2013/0083992 A1 Apr. 4, 2013

(51) Int. Cl.
*G06K 9/00* (2006.01)
*G06T 7/00* (2006.01)
*H04N 13/02* (2006.01)
*H04N 13/00* (2006.01)

(52) U.S. Cl.
CPC ..... *G06T 7/0075* (2013.01); *G06T 2207/10012* (2013.01); *H04N 13/0239* (2013.01); *H04N 2013/0081* (2013.01)
USPC ......................................................... 382/154

(58) Field of Classification Search
None
See application file for complete search history.

(56) References Cited

U.S. PATENT DOCUMENTS

| 7,929,042 | B2 * | 4/2011 | Terashima | 348/345 |
| 2007/0031060 | A1 * | 2/2007 | Okada | 382/274 |
| 2012/0007975 | A1 * | 1/2012 | Lyons et al. | 348/77 |
| 2012/0200729 | A1 * | 8/2012 | Hoda et al. | 348/222.1 |
| 2012/0314044 | A1 * | 12/2012 | Ogawa | 348/77 |
| 2013/0278727 | A1 * | 10/2013 | Tamir et al. | 348/47 |

* cited by examiner

*Primary Examiner* — Vikkram Bali
(74) *Attorney, Agent, or Firm* — McClure, Qualey & Rodack, LLP

(57) ABSTRACT

In one embodiment, a method of two-dimensional to stereoscopic image conversion, the method comprising detecting a face in a two-dimensional image; determining a body region based on the detected face; providing a color model from a portion of the determined body region, a portion of the detected face, or a combination of both portions; calculating a similarity value of at least one image pixel of the two-dimensional image based on the provided color model; and assigning a depth value of the image pixel based on the calculated similarity value to generate a stereoscopic image.

22 Claims, 9 Drawing Sheets

METHOD AND SYSTEM OF TWO-DIMENSIONAL TO STEREOSCOPIC CONVERSION

TECHNICAL FIELD

The present disclosure is generally related to image processing, and, more particularly, is related to two-dimensional to stereoscopic conversion of video and images.

BACKGROUND

Stereoscopic (e.g., three-dimensional) converters are generally designed to take traditional two-dimensional content and convert it into a polarized anaglyph image, or essentially two images of slightly different perspective and light level superimposed on each other. In the process of creating a stereoscopic perspective image out of a two-dimensional image, objects or portions of objects within the image may be repositioned along the horizontal, or X axis. By way of example, an object within an image can be "defined" by drawing around or outlining an area of pixels within the image. Once such an object has been defined, an appropriate depth can be "assigned" to that object in the resulting stereoscopic image by horizontally shifting the object in the alternate perspective view. To this end, depth placement algorithms or the like can be assigned to objects for the purpose of placing the objects at their appropriate depth locations.

Once portrait images appear in photos or films, object(s) (e.g., figure(s)) in the foreground, such as one or more individuals, rather than the background, generally become the focused area. For instance, conversion software generally analyzes shapes and colors, determines the objects that are present in the foreground and background, and then creates a map of the images to create two slightly different versions giving the parallax image our eyes need to receive to experience stereoscopic viewing. For two-dimensional to stereoscopic conversion, a closer depth value is assigned to the figures in the foreground. However, in existing processes, such as k-means segmentation, it is often difficult to precisely analyze and separate the figures from the background, so incorrect segmentations may introduce notable defects in two-dimensional to stereoscopic conversion processing. Stated differently, it is often difficult to assign proper depth values to each segment, which may result in a less than satisfactory stereoscopic experience.

SUMMARY

In one embodiment, a method of two-dimensional to stereoscopic image conversion, the method comprising detecting a face in a two-dimensional image; determining a body region based on the detected face; providing a color model from a portion of the determined body region, a portion of the detected face, or a combination of both portions; calculating a similarity value of at least one image pixel of the two-dimensional image based on the provided color model; and assigning a depth value of the image pixel based on the calculated similarity value to generate a stereoscopic image.

In another embodiment, a method of two-dimensional to stereoscopic image conversion, the method comprising detecting a face in a two-dimensional image; determining a body region based on the detected face; providing a feature model from a portion of the determined body region, a portion of the detected face, or a combination of both portions; calculating a similarity value of at least one image pixel of the two-dimensional image based on the provided feature model; and assigning a depth value of the image pixel based on the calculated similarity value to generate a stereoscopic image.

In another embodiment, a method of two-dimensional to stereoscopic image conversion, the method comprising: detecting multiple faces in a two-dimensional image; determining multiple body regions based on the multiple detected faces; providing a color model from a portion of the determined multiple body regions, a portion of the multiple detected faces, or a combination of both portions; calculating a similarity value of at least one image pixel of the two-dimensional image based on the provided color model; and assigning a depth value of the image pixel based on the calculated similarity value to generate a stereoscopic image.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Disclosed herein are certain embodiments of an invention that comprises a two-dimensional to stereoscopic conversion system and method (herein, collectively two-dimensional to stereoscopic system or two-dimensional to stereoscopic conversion systems) that may improve the smoothness of depths assigned to foreground objects (e.g., a figure(s)) of an image (e.g., a photograph, film, or video frame or picture) by using the similarity of image pixels to adjust a depth map. In one embodiment, a two-dimensional to stereoscopic conversion system detects a face in an image (e.g., two-dimensional image), and determines the associated body region (or portion thereof) based on the size and/or location of the face. Further, the two-dimensional to stereoscopic conversion system generates a color model and/or a feature model based on all, or a portion of, the face, body region, or a combination of both, calculates similarity values of the image pixels at or in the vicinity of the face and/or body region based on the one or more aforementioned models, and modifies or assigns depth values of the image pixels based on the calculated similarity values. As a result, a user can experience stereoscopic portrait images without a significant introduction of artifacts.

Figure 1:
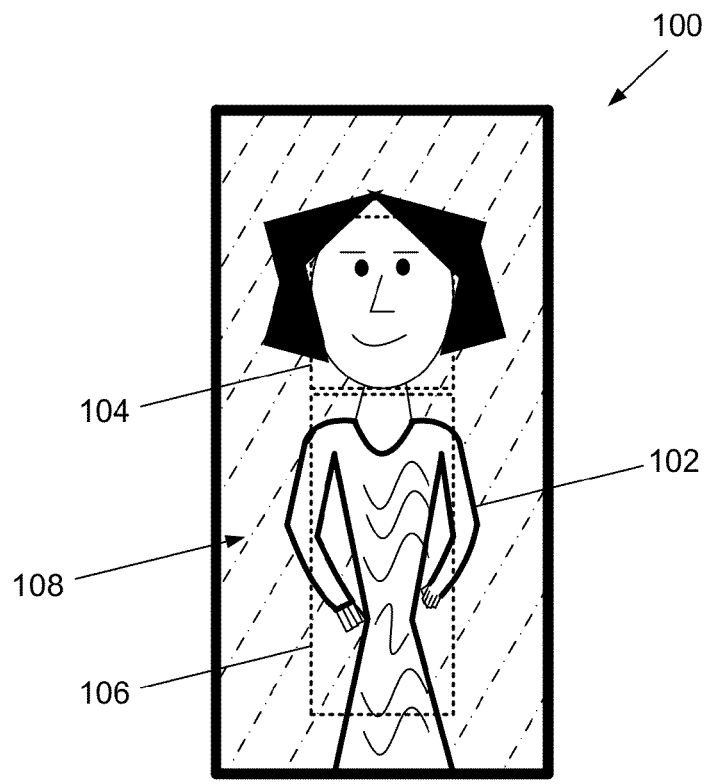
FIG. 1 is a schematic diagram depicting a portrait image that illustrates outlined or bounding regions as implemented by an example embodiment of a two-dimensional to stereoscopic conversion system.

Attention is directed to FIG. 1, which illustrates a portrait image 100 comprising a figure 102 of a person in the foreground for processing by an embodiment of a two-dimensional to stereoscopic conversion system. For instance, the two-dimensional to stereoscopic conversion system detects a size and location of the face and outlines (e.g., logically borders, bounds, or identifies) at least a portion of the image pixels of the face with a first bounding region 104 (shown in FIG. 1 partially obscured by the hair). The two-dimensional to stereoscopic conversion system then determines an associated body region based on the size and location of the face, and outlines at least a portion of the body region with a second bounding region 106. In the example depicted in FIG. 1, the second bounding region 106 is located proximally beneath, and adjacent to, the first bounding region 104. In one embodiment, the width of the bounding regions 104 and 106 are the same, with a difference in height (e.g., the second bounding region 106 having a longer length than the first bounding region 104). A background is identified in FIG. 1 as reference numeral 108, with the background 108 illustrated with plural dashed-and-dotted lines.

It should be appreciated that other configurations and/or relative arrangements for bounding regions may be implemented in some embodiments, such as a difference in relative locations of the bounding regions 104, 106, difference in ratio (e.g., in height and/or width), difference in quantity of bounding regions, and/or difference in the geometry or the manner of area coverage by the logical borders (e.g., shown in FIG. 1 as rectangles, but bounding regions may logically outline the targeted image pixels with circles, ovals, triangles, and/or other geometric configurations), and hence all such variations are contemplated to be within the scope of the disclosure. Further, though FIG. 1 depicts an example of a single figure 102 in the image portrait 100, it should be appreciated that certain embodiments of the two-dimensional to stereoscopic conversion system can perform detection and determination (and subsequent processing as explained below) of the face and body regions for multiple figures in parallel (e.g., simultaneous) operations.

Once the two-dimensional to stereoscopic conversion system detects and determines the face(s) and body region(s), the system analyzes the image pixels within the bounding regions 104 and 106. In one embodiment, the two-dimensional to stereoscopic conversion system uses an RGB color cube, Gaussian Mixture Model (GMM), or other known mechanisms to cluster the image pixel colors (e.g., statistically, etc.) and then provide (e.g., generate) one or more color models. For instance, all of the colors in an RGB color space may be represented by a three-dimensional matrix with axes corresponding to the color components red, green, and blue. Such a matrix constitutes an RGB color cube as described below. A typical RGB image may utilize only a fraction of the total number of colors available in the RGB color space.

In one embodiment, the image pixel colors correspond to the image pixel colors of the first bounding region 104 and/or the second bounding region 106. For instance, the image pixel colors used to generate the color model may correspond to all or a portion of the face(s), body region(s), or a combination of the face(s) and body region(s) or portions thereof.

In some embodiments, there may be plural color models that, for instance, have been previously generated (e.g., by the two-dimensional to stereoscopic conversion system, or downloaded by similar functionality residing at another device) and are stored by the two-dimensional to stereoscopic conversion system and matched (by the two-dimensional to stereoscopic conversion system) with a given image portrait as needed (as opposed to generated in real-time or near real-time).

Figure 2:
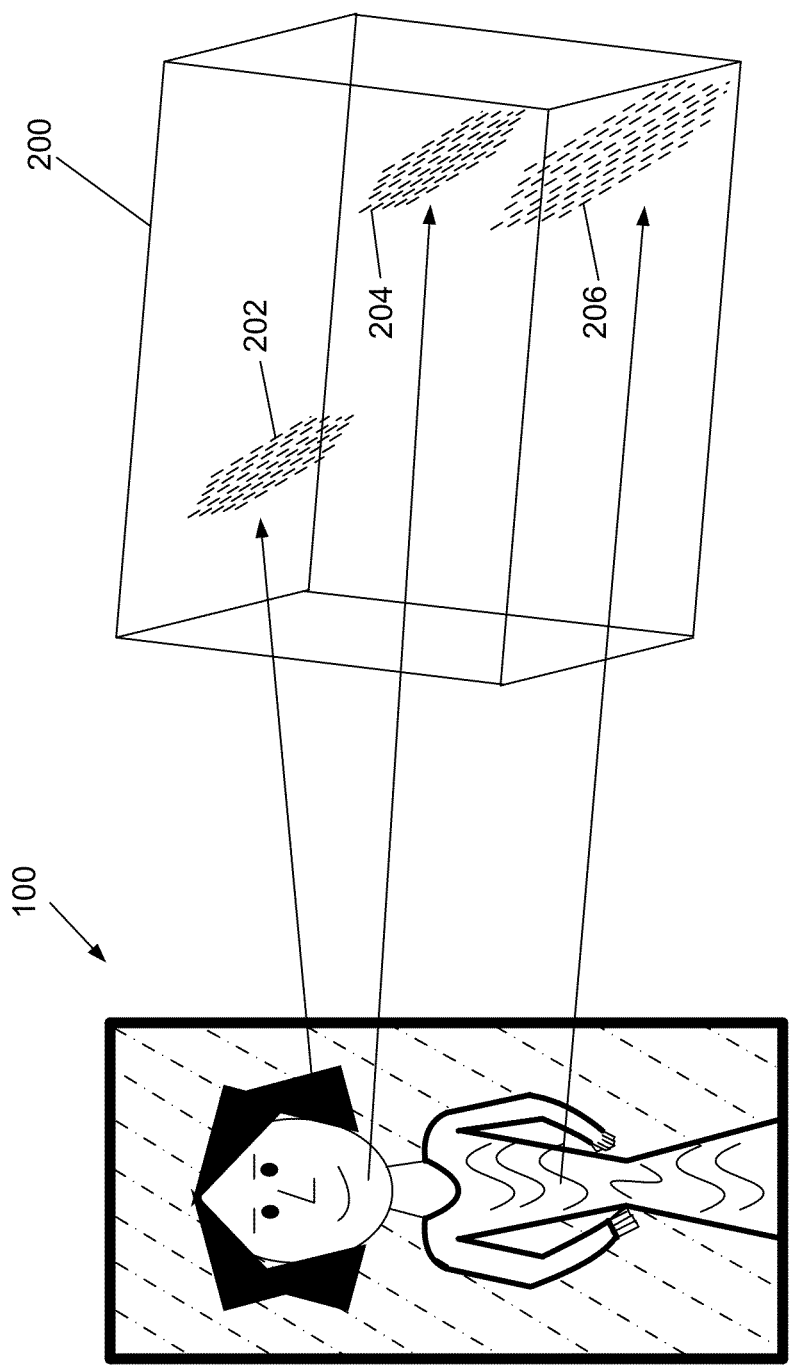
FIG. 2 is a mixed schematic and block diagram that illustrates a mapping of a color image to a color cube as implemented by an embodiment of a two-dimensional to stereoscopic conversion system.

In one embodiment, the colors that are used in an RGB image may be mapped onto an RGB color cube 200, as illustrated in FIG. 2. In FIG. 2, the source image (e.g., the image portrait 100) is mainly composed in this example of black (e.g., for the hair), flesh color (e.g., for the skin), and say, champagne (e.g., for the dress). The dense parts of the color distribution in the RGB color cube 200 are clustered according to groups 202 (black), 204 (flesh), and 206 (champagne) by mean-shift and selected as the prime colors.

Figure 3:
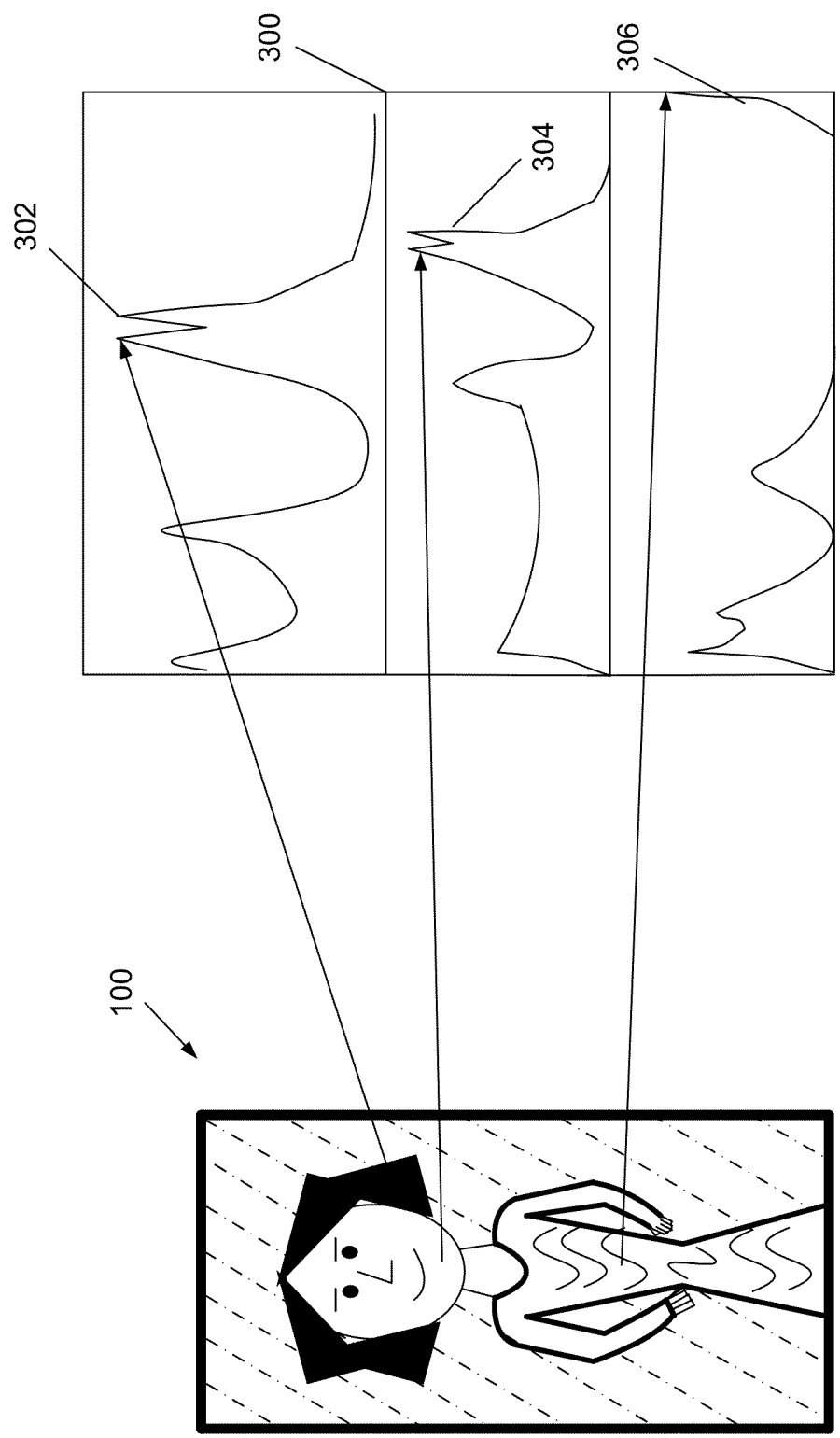
FIG. 3 is a mixed schematic and block diagram that illustrates a mapping of a color image to a histogram as implemented by an embodiment of a two-dimensional to stereoscopic conversion system.

Referring to FIG. 3, in some embodiments, an RGB color histogram 300 of the source image 100 may be used. As depicted in FIG. 3, the RGB values of the respective peak points 302 (black), 304 (flesh), and 306 (champagne) are selected as the prime colors.

Figure 4:
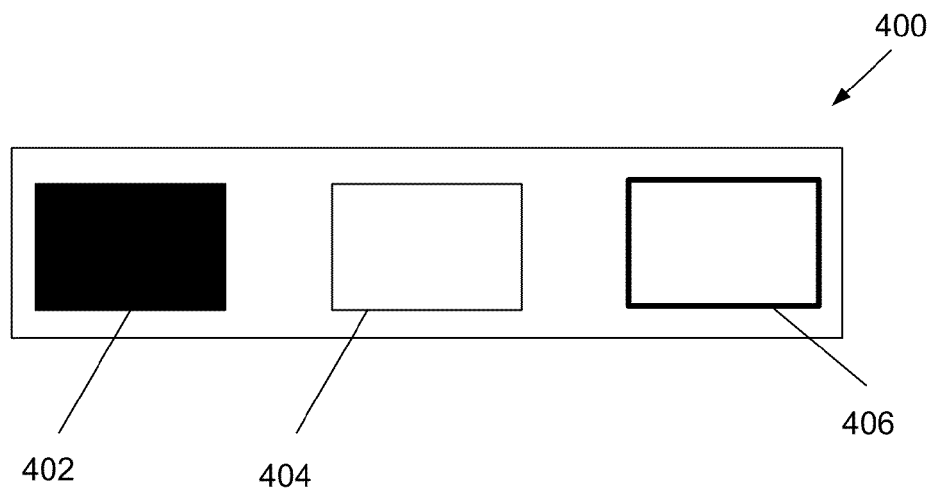
FIG. 4 is a block diagram that illustrates an example embodiment of a color model as provided by an embodiment of a two-dimensional to stereoscopic conversion system.

As indicated above, in one embodiment, the two-dimensional to stereoscopic conversion system generates a color model based on one or more of a plurality of techniques, such as via a statistical clustering of the image pixel colors using a color cube approach, or through use of a histogram. Referring to FIG. 4, shown is an example embodiment of a color model 400 generated by an embodiment of the two-dimensional to stereoscopic conversion system. The color model 400 shown in FIG. 4 is for illustrative purposes, and it should be understood within the context of the present disclosure that other quantities of prime colors may constitute a suitable color model in some embodiments. The color model 400 depicted in FIG. 4 comprises three (3) prime colors (with color distinctions represented in FIG. 4 by differences in fill or border): prime color 402 (represented in FIG. 4 with a "black" color fill), prime color 404 (represented in FIG. 4 with a "white" color fill and normal border), and prime color 406 (represented in FIG. 4 with a "white" color fill and bold border). In one embodiment, the prime colors 402, 404, 406 are generated by the two-dimensional to stereoscopic conversion system from high density parts of a color cube (e.g., corresponding to image pixels colors of bounding regions 104 and 106).

In one embodiment, as noted above, one or more prime colors may be determined based on a histogram from a portion of the determined body region, a portion of the detected face, or a combination of both portions. A similarity value may be calculated as follows. For instance, assume (without limitation) that the dynamic range of the color scale RGB may comprise (0, 0, 0) to (255, 255, 255). Calculation of similarity values (e.g., from the color distance) may be achieved according to the following formula (1):

$$\text{Similarity} = 1 - \frac{\min_i \sqrt{\begin{array}{c}(\text{Prime}[i], R - \text{Pixel}, R)^2 + \\ (\text{Prime}[i], G - \text{Pixel}, G)^2 + \\ (\text{Prime}[i], B - \text{Pixel}, B)^2\end{array}}}{255\sqrt{3}} \quad (1)$$

In some embodiments, the calculation of similarity values may be based on the Gaussian Mixture model, as indicated above. For instance (and without limitation), given a Gaussian Mixture Model G from a portion of the determined body region, a portion of the detected face, or a combination of both portions, and assuming K is the number of Gaussian, $\pi_k$ is the weight of each Gaussian, k=1~K, $N(\mu_k, \Sigma_k)$ is the distribution of each Gaussian, k=1~K.

Then, for a color pixel $X_i$, the probability of $X_i$ in G (as well as the similarity) is determined according to Equation (2) below:

$$\text{Similarity} = \sum_{k=1}^{K} \pi_k N(X_i \mid \mu_k, \Sigma_k) \quad (2)$$

Figure 5:
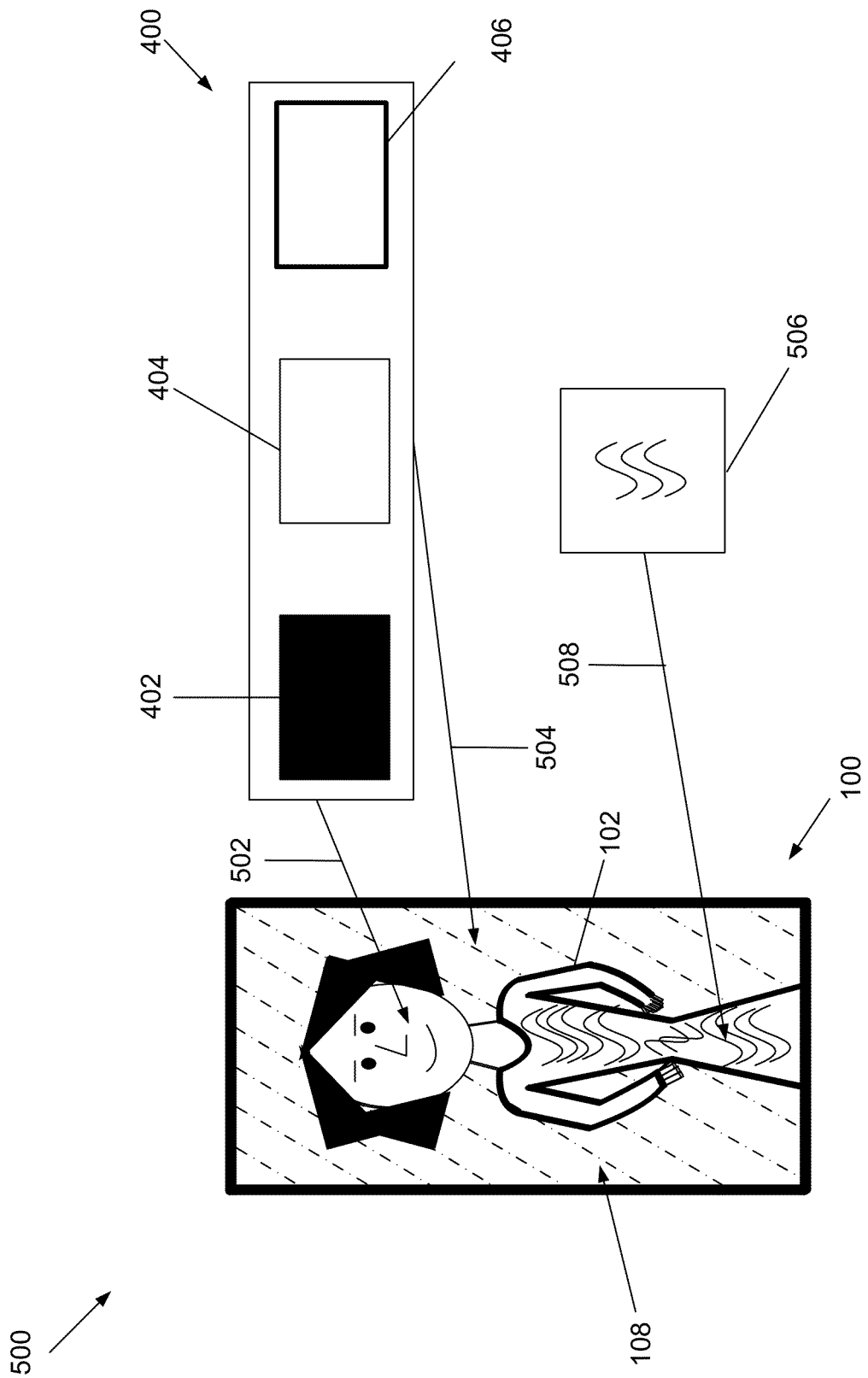
FIG. 5 is a mixed schematic and block diagram depicting an example process of assigning similarity values to image pixels based on a feature and color model of an example embodiment of a two-dimensional to stereoscopic conversion system.

Having described an example color model 400, attention is directed to FIG. 5, which comprises a mixed schematic and block diagram 500 that illustrates application of the color model 400 to the image portrait 100, and in particular, the assignment of similarity values to areas of the image portrait. Each of the reference numerals in parenthesis below correspond to the step (among plural steps) of an embodiment of a two-dimensional to stereoscopic conversion process. In general, the two-dimensional to stereoscopic conversion system calculates the similarity of each image pixel in the image portrait 100 based on the color model 400 (comprising the prime colors 402, 404, and 406). In this example, assume the prime colors 402, 404, and 406 correspond to a black color, a flesh color, and a champagne color, respectively (pertaining to hair color, skin tone, and dress color in bounding regions 104 and 106). For instance, the flesh color of the cheek region of the face of the figure 102 is similar to one of the prime colors (e.g., prime color 404) in the generated color model 400, so the two-dimensional to stereoscopic conversion system assigns a higher similarity value to each image pixel in this region (502). On the other hand, the color (e.g., assume the dashed-and-dotted lines represent white) of the background region 108 (e.g., white, as opposed to black, flesh, or champagne) is not similar to any one of the prime colors 402, 404, and 406 in the generated color model 400, so the two-dimensional to stereoscopic conversion system assigns a low similarity value to image pixels in this region instead (504). Note that in some embodiments, detected smooth regions (not edge regions) may be assigned similarity values using a few (subset) pixels to represent neighboring pixels in a sub-sampling manner, such as to improve computation speeds.

From the similarity values assigned to each pixel of the portrait image 100, the two-dimensional to stereoscopic conversion system assigns the depth value of each of the pixels in the image portrait 100. For instance, in one embodiment, the two-dimensional to stereoscopic conversion system gives (e.g., assigns) a closer depth value to the pixel with higher similarity value; and gives a far depth value to the pixel with a lower similarity value. It should be appreciated within the context of the present disclosure that the similarity values may be configured in any manner that enables a distinction of the foreground and background pixels of a given image portrait. For instance, byte-based values (e.g., ranging from 0-255) or float-type values (e.g., 0.0-1.0) may be employed in some embodiments.

One result of the depth value assignments is that the two-dimensional to stereoscopic conversion system generates a depth map, with distinctions between background and foreground readily apparent. For instance, bright pixel images of the figure 102 may represent or otherwise be interpreted to mean that the areas containing the bright image pixels are closer to a viewer in a stereoscopic presentation, the map clearly indicating that the woman (e.g., figure 102) stands in front of the background. From the map, additional processing (e.g., depth image based rendering, or DIBR) may be implemented to transform the depth map to a stereoscopic view. In some embodiments, the depth map may be generated according to other methods and modified by the assigned depth values according to the methods employed by the two-dimensional to stereoscopic conversion system.

It is noted that FIG. 5 also depicts a feature extraction and feature map or model method. That is, certain embodiments of a two-dimensional to stereoscopic conversion system may analyze the bounding regions 104 and 106 and extract one or more features from the image portrait 100. Such feature extraction may be performed alone in some embodiments, or in some embodiments, in combination with the color model. In one example, the feature is extracted based on a feature map or model 506, and comprises a prime texture gradient from the image pixels inside the second bounding region 106 encompassing a portion of the dress worn by the woman (508). That is, the texture of the dress is similar to a prime texture (from map 506) residing in the bounding region 106 (see FIG. 1A), so the two-dimensional to stereoscopic conversion system assigns a higher similarity value as well as a closer depth value to the cloth regions (i.e., the dress). One method embodiment for calculating similarity from a feature distance is as follows. A first-order covariance matrix may be used to represent a given feature (e.g., texture). Given N pixel values denoted {X1}, . . . , {Xn} from a block of the determined body region or detected face, the first-order covariance matrix is defined by Equation (3) below:

$$Xij = \text{cov}(Xi, Xj) = E[(Xi-\mu_i)(Xj-\mu_j)] \text{ where } \mu \text{ is the mean value} \quad (3)$$

Given N pixel values denoted {Y1}, . . . , {Yn} from a block of the target region, the first-order covariance matrix is defined by Equation (4) below:

$$Yij = \text{cov}(Yi, Yj) = E[(Yi-\mu_i)(Yj-\mu_j)] \quad (4)$$

The similarity between these two blocks may then be calculated by solving Equation (5) below:

$$\text{Similarity} = \frac{N}{\Sigma_{ij}|Xij - yij|} \quad (5)$$

It should be appreciated, within the context of the present disclosure, that other prime features may be used in addition to, or in lieu of, the prime texture.

Figure 6:
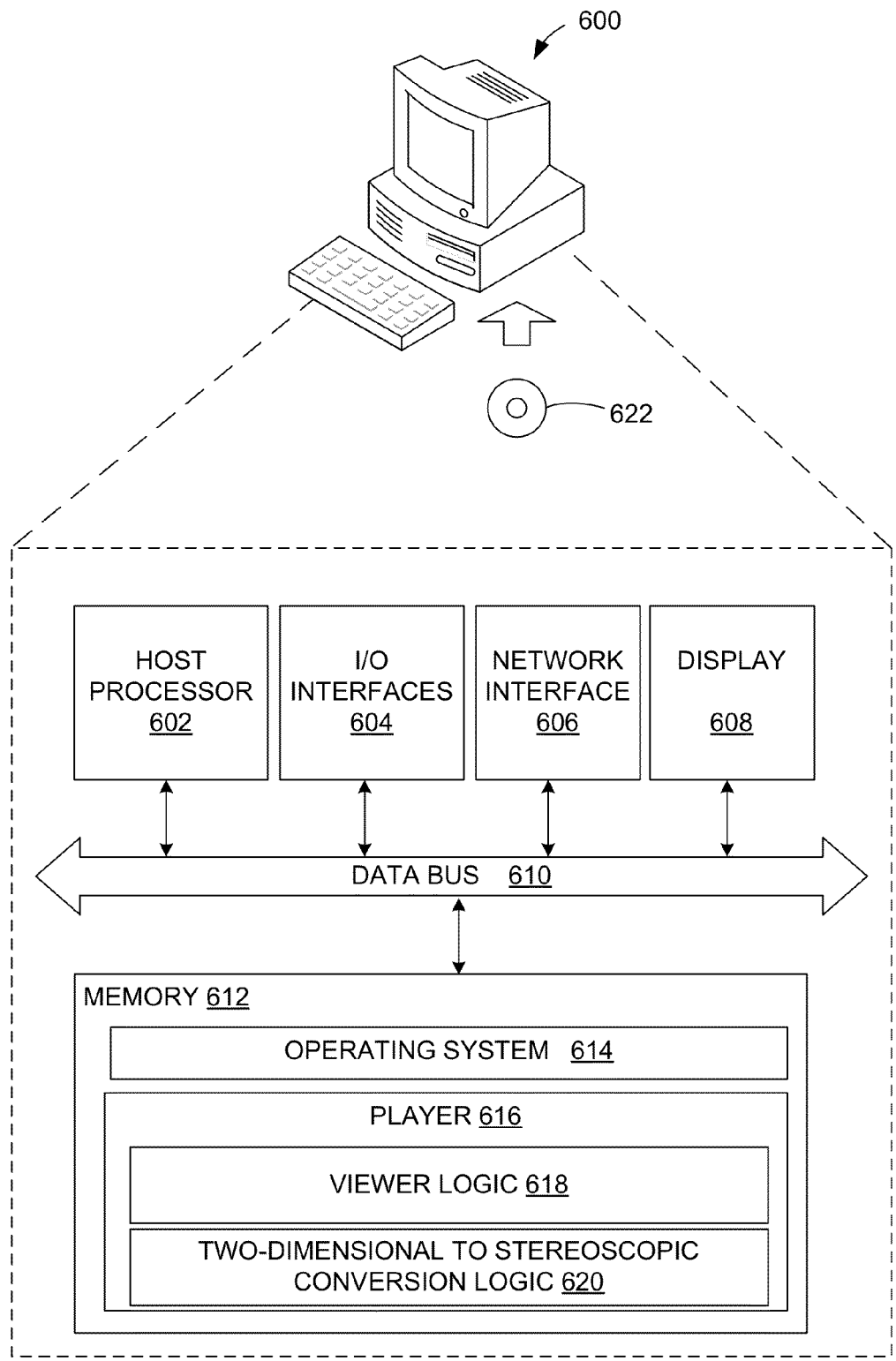
FIG. 6 is a block diagram of an example embodiment of a two-dimensional to stereoscopic conversion apparatus.

Reference is now made to FIG. 6, which illustrates an embodiment of a two-dimensional to stereoscopic conversion apparatus 600. In one embodiment, a two-dimensional to stereoscopic conversion system may embody the entire apparatus 600 depicted in FIG. 6, or in some embodiments, a portion thereof, and/or additional components to those depicted in FIG. 6. Though depicted as a computer, the apparatus 600 may comprise any one of a plurality of devices, including a dedicated player appliance, set-top box, laptop, computer workstation, cellular phone, personal digital assistant (PDA), handheld or pen based computer, embedded appliance, or other communication (wired or wireless) device that is coupled to, or integrated with, a disc drive (e.g., optical disc drive, magnetic disc drive, etc.) for enabling playback of multimedia content from a computer readable medium. In some embodiments, a two-dimensional to stereoscopic conversion system may be implemented on a network device located upstream of the apparatus 600, such as a server, router, etc., or implemented with similar functionality distributed among plural devices (e.g., in a server device and the apparatus 600). An upstream network device may be configured with similar components, and hence discussion of the same is omitted for brevity.

The apparatus 600 may, for instance, comprise a host processor 602, one or more input/output interfaces 604 (I/O interfaces), a network interface device 606 (network interface), and a display 608 connected across a data bus 610. The apparatus 600 may further comprise a memory 612 that includes an operating system 614 and application specific software, such as a player application 616 (or also, referred to herein as player logic or player). The player application 616 comprises, among other logic (e.g., software), viewer logic 618 and two-dimensional to stereoscopic conversion logic 620. The viewer logic 618 may be implemented as a software program configured to read and play back content residing on the disc 622 (or from other high definition video sources) according to the specifications defined by standards such as the Blu-ray Disc format specification, HD-DVD, etc. In one example operation, once the disc 622 or other video source is received by the viewer logic 618, the viewer logic 618 can execute and/or render one or more user interactive programs residing on the disc 622.

Such a user interactive program can include, but is not limited to, a movie introductory menu or other menus and user interactive features allowing a user to enhance, configure, and/or alter the viewing experience, choose playback configuration options, select chapters to view within the disc 622, in-movie user interactive features, games, or other features as should be appreciated. One of the options may include provision for converting a two-dimensional presentation (e.g., movie, sports event, photos, among other multimedia content) to a stereoscopic presentation. For instance, responsive to user selection (e.g., in a menu) of the two-dimensional to stereoscopic conversion option, the two-dimensional to stereoscopic conversion logic 620 is activated, and the two-dimensional to stereoscopic conversion logic 620 performs two-dimensional to stereoscopic conversion in a manner as described in association with one or more methods described at least in part above and illustrated in FIGS. 7-9 and described below. In some embodiments, two-dimensional to stereoscopic conversion may be pre-selected as a default option, and hence conversion is not immediately responsive to user selection of a like-labeled button icon. Note that the player logic 616 may also be implemented, in whole or in part, as a software program residing in mass storage, the disc 622, a network location, or other locations, as should be appreciated by one having ordinary skill in the art.

The host processor 602 may include any custom made or commercially available processor, a central processing unit (CPU) or an auxiliary processor among several processors associated with the apparatus 600, a semiconductor based microprocessor (in the form of a microchip), one or more ASICs, a plurality of suitably configured digital logic gates, and other well-known electrical configurations comprising discrete elements both individually and in various combinations to coordinate the overall operation of the computing system.

The memory 612 may include any one of a combination of volatile memory elements (e.g., random-access memory (RAM, such as DRAM, and SRAM, etc.)) and nonvolatile memory elements (e.g., ROM, hard drive, tape, CDROM, etc.). The memory 612 typically comprises the native operating system 614, one or more native applications, emulation systems, or emulated applications for any of a variety of operating systems and/or emulated hardware platforms, emulated operating systems, etc. For example, the applications may include application specific software stored on a computer readable medium for execution by the host processor 602 and may include the player application 616 and its corresponding constituent components. One of ordinary skill in the art will appreciate that the memory 612 may, and typically will, comprise other components which have been omitted for purposes of brevity.

Input/output interfaces 604 provide any number of interfaces for the input and output of data. For example, where the apparatus 600 comprises a personal computer, these components may interface with a user input device, which may be a keyboard, a mouse, or voice activated mechanism. Where the apparatus 600 comprises a handheld device (e.g., PDA, mobile telephone), these components may interface with function keys or buttons, a touch sensitive screen, a stylus, etc. The input/output interfaces 604 may further include one or more disc drives (e.g., optical disc drives, magnetic disc drives) to enable playback of multimedia content residing on the computer readable medium 622.

The network interface device 606 comprises various components used to transmit and/or receive data over a network environment. By way of example, the network interface device 606 may include a device that can communicate with both inputs and outputs, for instance, a modulator/demodulator (e.g., a modem), wireless (e.g., radio frequency (RF)) transceiver, a telephonic interface, a bridge, a router, network card, etc. The apparatus 600 may further comprise mass storage (not shown). For some embodiments, the mass storage may include a data structure (e.g., database) to store and manage data. Such data may comprise, for example, editing files which specify special effects for a particular movie title.

The display 608 may comprise a computer monitor or a plasma screen for a PC or a liquid crystal display (LCD) on a hand held device, for example. In some embodiments, the display 608 may be separate from the apparatus 600.

In the context of this disclosure, a "computer-readable medium" stores one or more programs and data for use by or in connection with the instruction execution system, apparatus, or device. The computer readable medium is non-transitory, and may be, for example, but not limited to, an electronic, magnetic, optical, electromagnetic, infrared, or semiconductor system, apparatus, or device. More specific examples (a non-exhaustive list) of the computer-readable medium may include, in addition to those set forth above, the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), and a portable compact disc read-only memory (CDROM) (optical).

Figure 7:
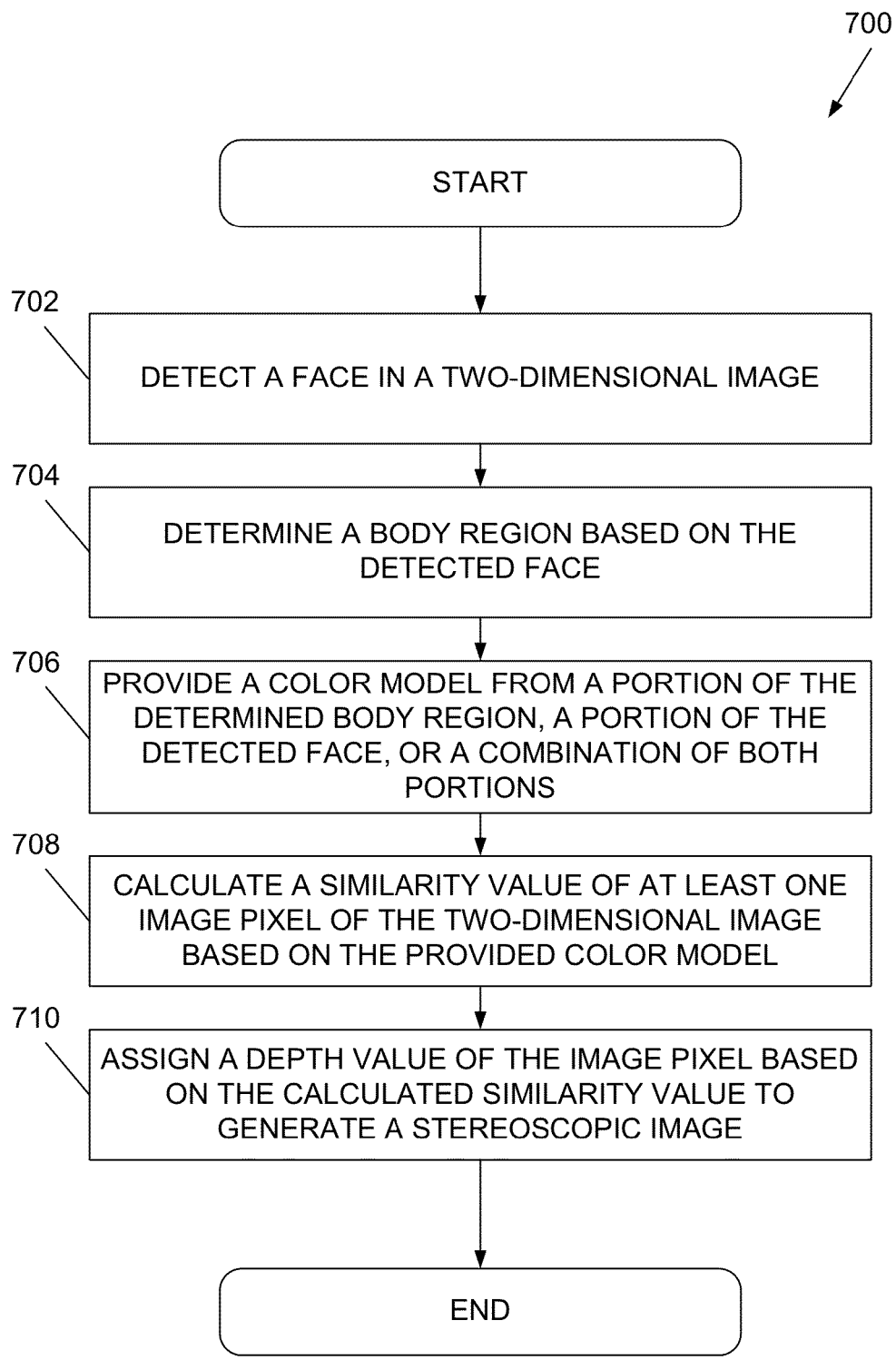
FIG. 7 is a flow diagram of an example embodiment of a two-dimensional to stereoscopic conversion method.

Having provided a detailed description of certain embodiments of two-dimensional to stereoscopic conversion systems, it should be appreciated that one embodiment of a two-dimensional to stereoscopic image conversion method 700, implemented by the apparatus 600 and depicted in FIG. 7, comprises detecting a face in a two-dimensional image (702); determining a body region based on the detected face (704); providing a color model from a portion of the determined body region, a portion of the detected face, or a combination of both portions (706); calculating a similarity value of at least one image pixel of the two-dimensional image based on the provided color model (708); and assigning a depth value of the image pixel based on the calculated similarity value (710) to generate a stereoscopic image.

Figure 8:
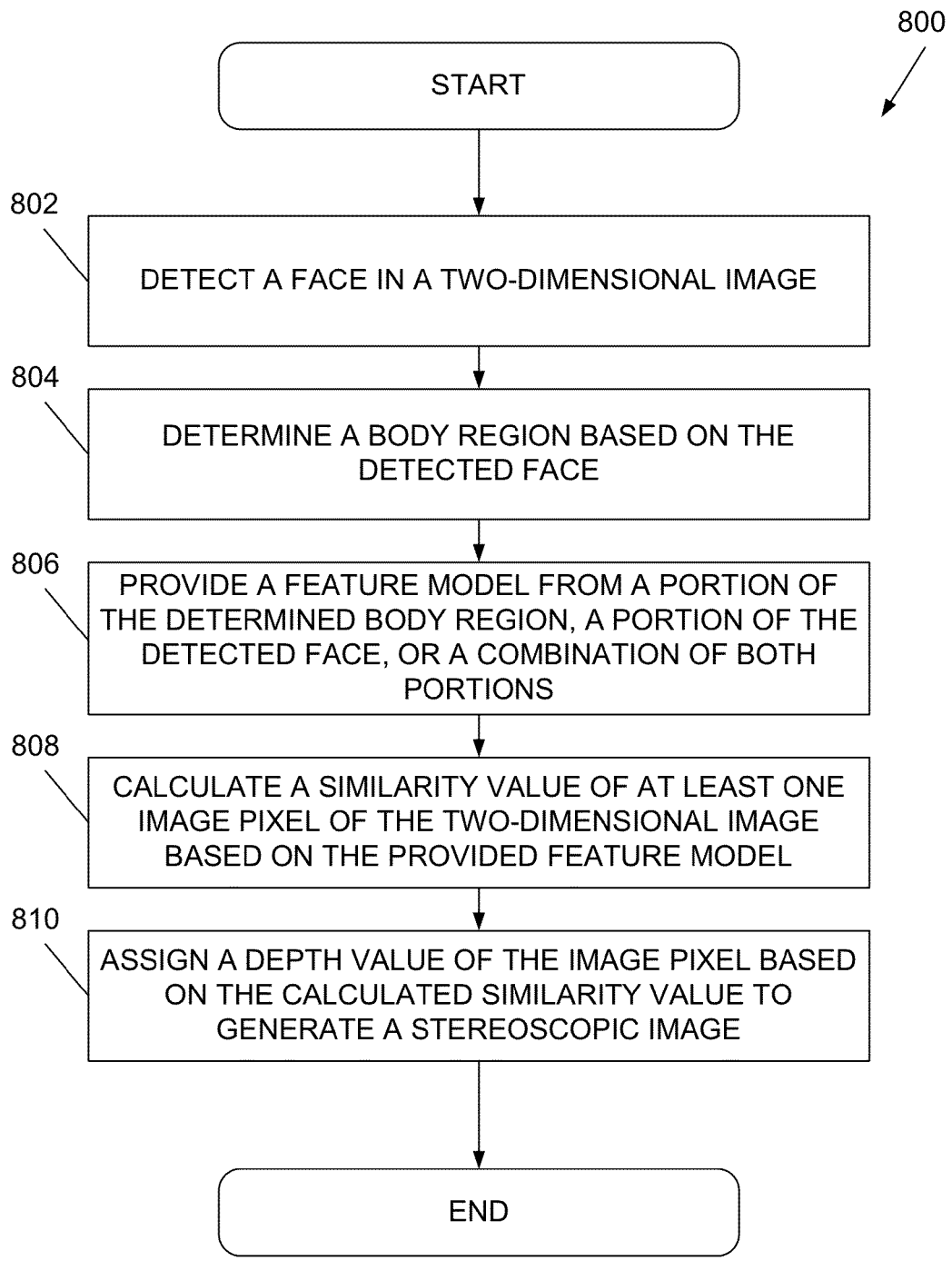
FIG. 8 is a flow diagram of another example embodiment of a two-dimensional to stereoscopic conversion method.

In view of the foregoing disclosure, it should be appreciated that another embodiment of a two-dimensional to stereoscopic conversion method 800, implemented by the apparatus 600 and depicted in FIG. 8, comprises detecting a face in a two-dimensional image (802); determining a body region based on the detected face (804); providing a feature model from a portion of the determined body region, a portion of the detected face, or a combination of both portions (806); calculating a similarity value of at least one image pixel of the two-dimensional image based on the provided feature model (808); and assigning a depth value of the image pixel based on the calculated similarity value (810) to generate a stereoscopic image.

Figure 9:
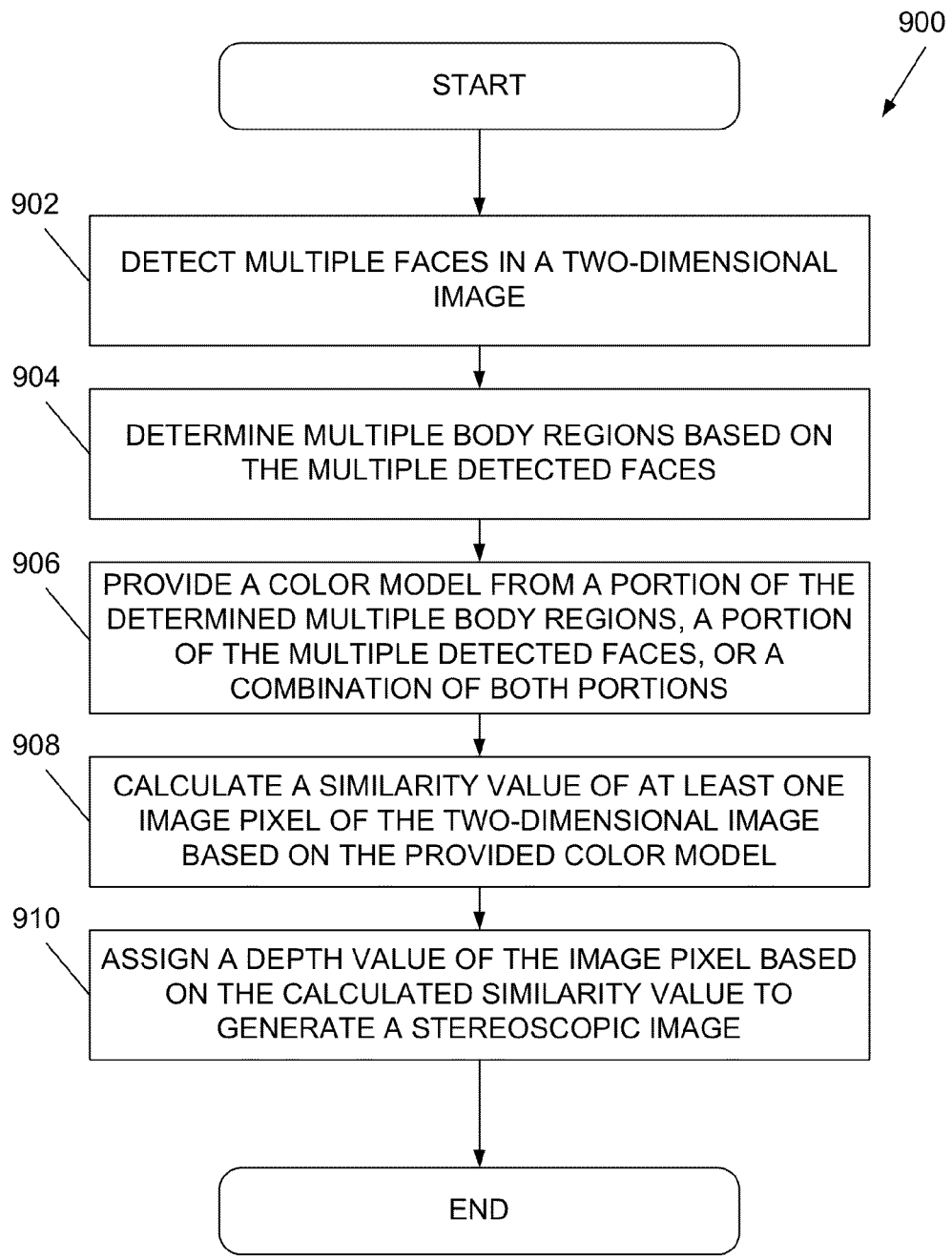
FIG. 9 is a flow diagram of another example embodiment of a two-dimensional to stereoscopic conversion method.

In view of the foregoing disclosure, it should be appreciated that another embodiment of a two-dimensional to stereoscopic conversion method 900, implemented by the apparatus 600 and depicted in FIG. 9, comprises detecting multiple faces in a two-dimensional image (902); determining multiple body regions based on the multiple detected faces (904); providing a color model from a portion of the determined multiple body regions, a portion of the multiple detected faces, or a combination of both portions (906); calculating a similarity value of at least one image pixel of the two-dimensional image based on the provided color model (908); and assigning a depth value of the image pixel based on the calculated similarity value to generate a stereoscopic image (910).

It should be appreciated that the term portion in FIGS. 7-9 may include all or a subset of the given object(s) (e.g., face, body region, etc.).

Figure 10:
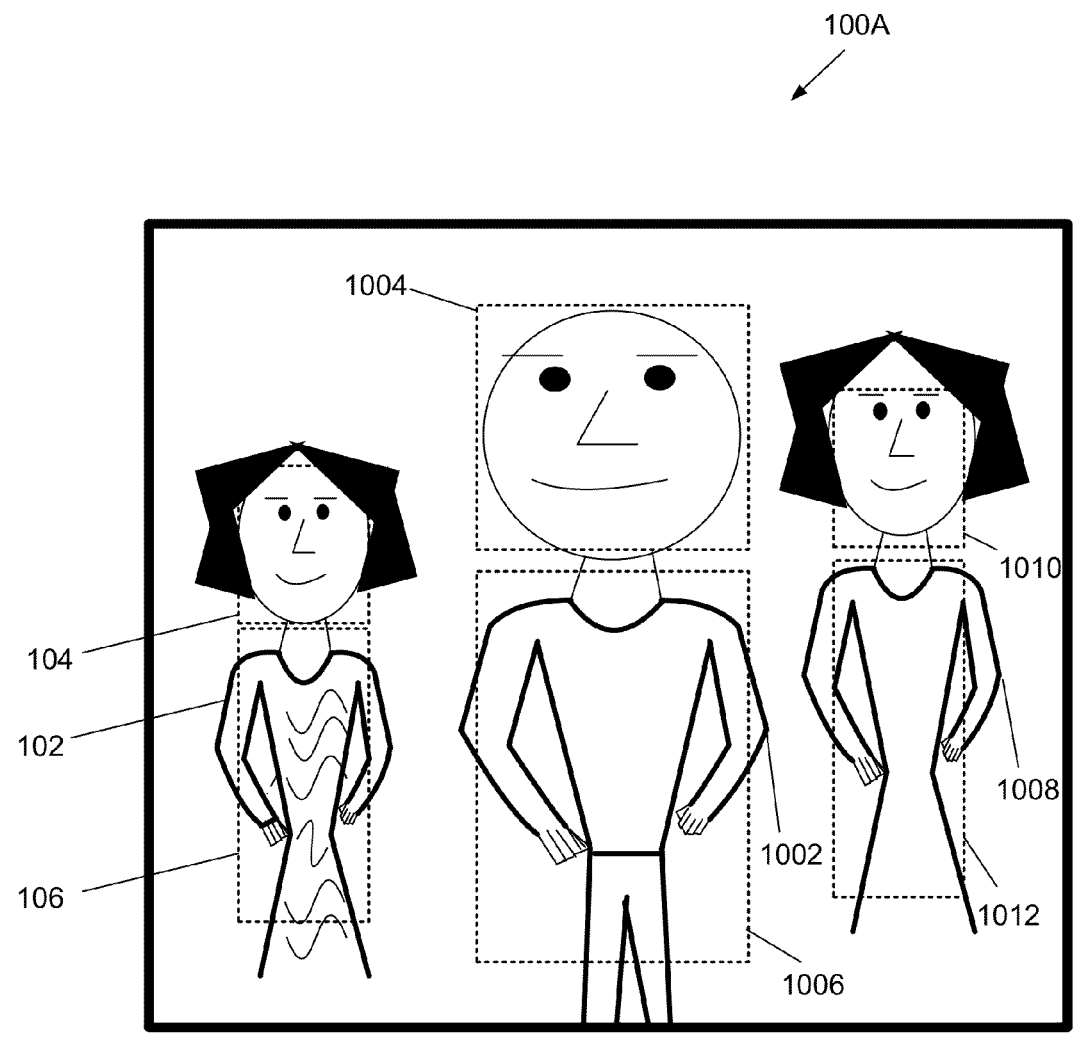
FIG. 10 is a schematic diagram depicting a portrait image, similar to FIG. 1, with multiple figures upon which an embodiment of a two-dimensional to stereoscopic conversion system may be implemented.

An example of an image portrait 100A with multiple figures 102, 902, and 908 is shown in FIG. 10. F*igure* 102 is subjected by an embodiment of the two-dimensional to stereoscopic conversion system to the first bounding region 104 and the second bounding region 106. F*igure* 1002 is subjected to a third bounding region 1004 (to detect the face) and a fourth bounding region 1006 (to detect the body). Similarly, figure 1008 is subjected to a fifth bounding region 1010 (the face) and a sixth bounding region 1012 (the body). In one embodiment, the method 900 described in FIG. 9 may be employed here to generate a stereoscopic image, wherein similarity values are calculated based on the multiple detected faces or body regions and a given color model, and depth values assigned. For instance, the faces detected in bounding regions 104, 1004, 1010 are compared based on size. If one face is larger than the other two faces, then that fact may be an indication that the figure with the largest face is closer to the viewer. Accordingly, the largest face is assigned a closer depth value. Other factors may be considered to validate this determination (e.g., to ensure that a larger face is not merely due to a larger-sized person). In this example, the face bounded by the third bounding region 1004 is determined to be larger than the faces bounded by the first bounding region 104 and the fifth bounding region 1010, and hence the method 900 assigns a closer depth value to the face associated with the figure 1002.

It should be appreciated by one having ordinary skill in the art that certain embodiments of two-dimensional to stereoscopic conversion methods may employ multiple methods to decide a final depth value in addition to the methods described in FIGS. 7, 8, and/or 9. For instance, one known technique may use the interposition of objects to decide the depth relationship of the objects. A final depth value may be achieved according to a weighted average of each depth value assigned through implementation of a given depth value determination method, or in some embodiments, according to a process that tallies close versus far determinations.

Any process descriptions or blocks in flow diagrams should be understood as representing modules, segments, or portions of code which include one or more executable instructions for implementing specific logical functions or steps in the process, and alternate implementations are included within the scope of the embodiments of the present disclosure in which functions may be executed out of order from that shown or discussed, including substantially concurrently or in reverse order, and/or with one or more functions omitted in some embodiments, depending on the functionality involved, as would be understood by those reasonably skilled in the art of the present disclosure. Also, though certain architectures are illustrated in the present disclosure, it should be appreciated that the methods described herein are not necessarily limited to the disclosed architectures.

In addition, though various delineations in software logic have been depicted in the accompanying figures and described in the present disclosure, it should be appreciated that one or more of the functions performed by the various logic described herein may be combined into fewer software modules and or distributed among a greater number. Further, though certain disclosed benefits/advantages inure to certain embodiments of two-dimensional to stereoscopic conversion systems, it should be understood that not every embodiment necessarily provides every benefit/advantage.

In addition, the scope of certain embodiments of the present disclosure includes embodying the functionality of certain embodiments of two-dimensional to stereoscopic conversion systems in logic embodied in hardware and/or software-configured mediums. For instance, though described in software configured mediums, it should be appreciated that one or more of the two-dimensional to stereoscopic conversion functionality described herein may be implemented in hardware or a combination of both hardware and software.

It should be emphasized that the above-described embodiments of the present disclosure are merely possible examples of implementations, merely set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

At least the following is claimed:

1. A method of two-dimensional to stereoscopic image conversion, the method comprising:
    detecting a face in a two-dimensional image;
    determining a body region based on the detected face;
    providing a color model from a portion of the determined body region, a portion of the detected face, or a combination of both portions;
    calculating a similarity value of at least one image pixel of the two-dimensional image based on the provided color model; and assigning a depth value of the image pixel based on the calculated similarity value to generate a stereoscopic image.

2. The method of claim 1, wherein determining comprises determining based on the size of the face.

3. The method of claim 1, wherein determining comprises determining based on a location of the face.

4. The method of claim 1, wherein providing comprises:
determining one or more prime colors from image pixel colors based on a statistical clustering method.

5. The method of claim 1, wherein providing comprises:
generating a histogram of image pixel colors; and
determining one or more prime colors from the histogram.

6. The method of claim 1, wherein assigning comprises:
assigning a closer depth value to the image pixel responsive to an image pixel assignment of a higher similarity value; and
assigning a farther depth value to the image pixel responsive to an image pixel assignment of a lower similarity value.

7. The method of claim 1, wherein the detecting, determining, and providing further comprises:
detecting multiple faces in the two-dimensional image;
determining multiple body regions based on the detected multiple faces; and
providing the color model from a portion of the determined body regions, a portion of the detected faces, or a combination of both portions.

8. A method of two-dimensional to stereoscopic image conversion, the method comprising:
detecting a face in a two-dimensional image;
determining a body region based on the detected face;
providing a feature model from a portion of the determined body region, a portion of the detected face, or a combination of both portions;
calculating a similarity value of at least one image pixel of the two-dimensional image based on the provided feature model; and
assigning a depth value of the image pixel based on the calculated similarity value to generate a stereoscopic image.

9. The method of claim 8, wherein determining comprises determining based on a size of the face.

10. The method of claim 8, wherein determining comprises determining based on a location of the face.

11. The method of claim 8, wherein providing comprises:
extracting one or more features of the image pixel; and
determining a prime feature from the one or more extracted features.

12. The method of claim 11, wherein extracting comprises extracting a texture gradient of the image pixel.

13. The method of claim 8, wherein calculating comprises:
calculating a similarity value based on a feature distance between one or more prime feature and image pixel colors, wherein the similarity value is a function of the feature distance.

14. The method of claim 8, wherein assigning comprises:
assigning either a closer depth value to the image pixel responsive to an image pixel assignment of a higher similarity value or a far depth value to the image pixel responsive to an image pixel assignment of a lower similarity value.

15. A method of two-dimensional to stereoscopic image conversion, the method comprising:
detecting multiple faces in a two-dimensional image;
determining multiple body regions based on the multiple detected faces;
providing a color model from a portion of the determined multiple body regions, a portion of the multiple detected faces, or a combination of both portions;
calculating a similarity value of at least one image pixel of the two-dimensional image based on the provided color model; and
assigning a depth value of the image pixel based on the calculated similarity value to generate a stereoscopic image.

16. The method of claim 15, wherein detecting multiple faces further comprises determining one or more of the size of the faces or relative location between the faces.

17. The method of claim 15, wherein assigning comprises:
assigning a closer depth value to the image pixel responsive to an image pixel assignment of a higher similarity value; and
assigning a farther depth value to the image pixel responsive to an image pixel assignment of a lower similarity value.

18. The method of claim 15, wherein detecting multiple faces further comprises:
determining sizes of the multiple detected faces, and
wherein the assigning comprises assigning a depth value of the image pixel based on the sizes of the multiple detected faces to generate a stereoscopic image.

19. The method of claim 18, wherein the assigning further comprises assigning a closer depth value to the image pixel responsive to a larger size of one of the multiple detected faces and wherein the assigning further comprises assigning a farther depth value to the image pixel responsive to a smaller size of one of the multiple detected faces.

20. The method of claim 15, further comprising:
providing a feature model from a portion of the determined multiple body regions, a portion of the multiple detected faces, or a combination of both portions;
calculating a second similarity value of at least one image pixel of the two-dimensional image based on the provided feature model; and
assigning another depth value of the image pixel based on the calculated second similarity value.

21. The method of claim 20, wherein the assigning further comprises:
assigning either a closer depth value to the image pixel responsive to an image pixel assignment of a higher second similarity value or a farther depth value to the image pixel responsive to an image pixel assignment of a lower second similarity value.

22. The method of claim 15, wherein the at least one image pixel of the two-dimensional image is a pixel located in a vicinity of at least one of the multiple detected faces or at least one of the determined multiple body regions.

* * * * *